United States Patent [19]

Ishizaki et al.

[11] Patent Number: 4,777,082

[45] Date of Patent: Oct. 11, 1988

[54] OPTICAL MAGNETIC RECORDING MEDIUM

[75] Inventors: Hideki Ishizaki; Takayoshi Kobuke; Suguru Takayama, all of Nagano, Japan

[73] Assignee: TDK Corporation, Tokyo, Japan

[21] Appl. No.: 87,989

[22] Filed: Aug. 17, 1987

Related U.S. Application Data

[63] Continuation of Ser. No. 828,524, Feb. 12, 1986, abandoned.

[30] Foreign Application Priority Data

Feb. 22, 1985 [JP]  Japan .................................. 60-34026

[51] Int. Cl.$^4$ ................................. G11B 7/24
[52] U.S. Cl. ..................... 428/216; 428/678; 428/679; 428/694; 428/900; 428/928
[58] Field of Search ............. 428/694, 900, 216, 679, 428/678, 928, 213; 369/13, 288; 365/122; 360/131, 135

[56] References Cited

U.S. PATENT DOCUMENTS

| | | | |
|---|---|---|---|
| 3,474,428 | 10/1969 | Nelson et al. | 340/174.1 |
| 3,680,065 | 7/1972 | Almasi et al. | 350/151 |
| 4,489,139 | 12/1984 | Ohta et al. | |
| 4,544,443 | 10/1985 | Ohta et al. | 430/321 |

FOREIGN PATENT DOCUMENTS 41451 3/1983 Japan .
48249 3/1983 Japan .

*Primary Examiner*—George F. Lesmes
*Assistant Examiner*—William M. Atkinson
*Attorney, Agent, or Firm*—Oblon, Fisher, Spivak, McClelland & Maier

[57] ABSTRACT

In an optical recording medium comprising a substrate and a recording layer thin film comprised of a rare earth element and a transition metal, for example, TbFeCo on the substrate, a metal thin film layer having a high magnetic permeability, for example, Permalloy is formed on the recording layer. A transparent dielectric film layer may be formed between the substrate and the recording layer thin film.

2 Claims, No Drawings

OPTICAL MAGNETIC RECORDING MEDIUM

BACKGROUND OF THE INVENTION

This invention relates to optical recording media of the type wherein information is recorded and reproduced with the use of heat and light of laser.

Among optical recording media are optical magnetic recording media or optical magnetic memories. There are well known a number of materials for the recording layer of such optical magnetic recording media, for example, MnBi, MnAlGe, MnSb, MnCuBi, GdFe, TbFe, GdCo, PtCo, TbCo, TbFeCo, GdFeCo, $TbFeO_3$, GdIG (gadolinium iron garnet), GdTbFe, GdTbFeCoBi, $CoFe_2O_4$, etc. These materials are deposited on transparent substrates of plastic material or glass as a thin film by any suitable thin-film forming techniques such as vacuum deposition or sputtering. The feature common to these optical magnetic recording thin film layers is that the axis of easy magnetization is perpendicular to the film surface. Other features are great Kerr and Farady effects.

By taking advantage of these features, the following optical magnetic recording process is contemplated for such optical magnetic recording thin films. At the outset, the entire film is rendered "0", that is, uniformly magnetized or erased. A laser beam is applied to the film at the site where it is desired to record "1". The temperature of that region of the film exposed to the beam is increased, and coercive force Hc approaches 0 when the temperature approaches and then exceeds the Curie point. When the temperature is allowed to return to room temperature after extinction of the laser beam, the magnetization is reversed by the energy of diamagnetic field. Alternatively, the temperature is allowed to return to room temperature with an external magnetic field being applied in an opposite direction to that at the initial during exposure to the laser beam, and then magnetization is reversed. There is recorded a signal "1". The remaining portion of the film where no laser beam is incident remains "0" because the initial state is "0".

The recorded data in the optical magnetic memory is read out by similarly using a laser beam to detect the magnetooptic effect, that is, the rotation of the polarization plane of reflected light with respect to the incident laser beam due to the reversal of magnetization.

Requirements imposed on such optical magnetic recording media are:
(1) that the compensation point is relatively low, and particularly near room temperature,
(2) that the Curie point is an adequate temperature,
(3) that noise-inducing defects such as grain boundary is relatively small, and
(4) that a magnetically and mechanically uniform film is attained over a relatively large area without resorting to a high temperature or long term film formation process.

In the light of these requirements, a great attention is recently drawn to amorphous perpendicular magnetizable thin films of rare earth element-transition metal among the above-mentioned materials. Optical magnetic recording media having such amorphous perpendicular magnetizable thin films of rare earth element-transition metal, however, require a rather complicated film formation process because the thin films contain a major proportion of rare earth elements, and are thus expensive to manufacture. There are additional disadvantages including an unstable film formation process, inconsistent electromagnetic properties, and low reliability.

Thus there is the need for solving these problems and it is particularly desired to make the perpendicular magnetizable thin films thinner and to reduce the amount of rare earth elements used.

The role rare earth elements play in thin films is to amorphitize the films and to improve Kerr rotation angle or Faraday rotation angle. These functions are essential to optical magnetic recording media and difficult to substitute some other means therefor. In optical magnetic recording media of the prior art structure, it was impossible to thin the recording layer thin film, to mitigate the role of rare earth elements, to achieve a stable and less expensive film formation step, and to realize improved reliability and electromagnetic properties while keeping the necessary functions unchanged. For example, the provision of various protective layers on the recording layer thin films has been proposed. Such approaches did not make essential access to the great role of rare earth elements in the media. These protective layers were insufficiently humidity proof to prevent rare earth elements from being preferentially attacked by oxygen and water in a high humidity atmosphere, resulting in deteriorated recording and reproducing properties.

SUMMARY OF THE INVENTION

Therefore, an object of the present invention is to provide a novel and improved optical magnetic recording medium which has the mitigated role of rare earth elements, high C/N ratio, high reliability, and improved storage, thus marking a great advance toward the commercial success of optical magnetic recording media.

It is a further object of the present invention to produce such improved optical magnetic recording media in a consistent manner at low cost.

According to a first aspect of the present invention, there is provided an optical recording medium comprising
a substrate,
a recording layer thin film comprised of a rare earth element and a transition metal on the substrate, and
a metal thin film layer having a high permeability on the recording layer.

According to a second aspect of the present invention, there is provided an optical recording medium comprising
a substrate,
a transparent dielectric film layer on the substrate,
a recording layer thin film comprised of a rare earth element and a transition metal on the dielectric film layer, and
a metal thin film layer having a high permeability on the recording layer.

DETAILED DESCRIPTION OF THE INVENTION

The optical magnetic recording media of the present invention include a recording layer thin film on a glass or plastic substrate, and a metal thin film layer on the recording layer thin film. The substrates are generally formed of resinous materials, typically acrylic resins and polycarbonate resins, but they may also be formed of glass, ceramic or similar materials.

The substrates generally have a refractive index nb of about 1.45 to 1.58. Since it is preferred to carry out recording through the substrates, their transmittance of recording or reading-out light is preferably 86% or higher. In general, the substrates are of disc shape having a thickness of about 1.2 to 1.5 mm, but they may be formed in another shape, for example, tape and drum.

The recording layer thin films are films in which information is magnetically recorded by means of modulated thermal beam or modulated magnetic field and the recorded information is reproduced through magnetic-optical conversion. Most preferred for this purpose are so-called perpendicular magnetizable films.

The recording layer thin films are generally formed from alloys containing rare earth elements and transition metals by conventional techniques such as sputtering and vacuum deposition. The rare earth elements and transition metals used include all the members of their chemically defined classes. The preferred rare earth elements are gadolinium (Gd) and terbium (Tb), and the preferred transition metals are iron (Fe) and cobalt (Co). Their preferred combinations are GdFe, TbFe, TbFeCo, GdFeCo, GdTbFe, GdTbFeCo, etc.

The recording layer thin films are preferably at least 5 nm thick, and more preferably 5 to 60 nm thick. Thin films having a thickness of less than 5 nm cannot be produced in sound form whereas films having a thickness of more than 60 nm undesirably require an extra power to accomplish recording.

Formed on the recording layer thin films are metal thin films. The metal thin films are formed of materials having a very high magnetic permeability, more particularly a relative magnetic permeability to direct current of at least 10.

The provision of the metal thin film layers of high permeability on the recording layers makes it possible to produce recording media in a consistent, inexpensive, and reliable manner while the recording media are capable of high density recording with increased outputs. The metal thin film layers also play the role of a protective layer for the recording layer thin film, afford humidity proofness, and additionally serve as a reflective film.

The metal thin film layers are formed of such materials as Permalloy, Sendust, and amorphous alloys containing transition metals and vitrifying elements by any suitable techniques including sputtering and vacuum deposition or evaporation.

The metal thin film layers are preferably 20 to 200 nm thick, and more preferably 20 to 80 nm thick. Satisfactory metal films cannot be obtained with thicknesses of less than 20 nm whereas films having a thickness of more than 200 nm undesirably require an extra power upon recording.

The total thickness of the recording layer thin film and the metal thin film layer preferably ranges from about 50 to about 200 nm.

Additionally, a transparent dielectric film layer may be interposed between the substrate and the recording layer of optical recording media. The dielectric film layers may be formed of any suitable dielectric materials such as $Si_3N_4$, AlN, ZnS, SiO, $SiO_2$, $Bi_{12}GeO_{22}$, etc. They effectively attain amplification effect by the multiple interference of reading light upon reading-out of a signal in the recording layer. They also serve as a barrier for preventing moisture from migrating from the substrate to the recording layer.

The dielectric film layers are formed by any suitable techniques such as sputtering and vacuum deposition or evaporation to a thickness $d=\lambda/4n$ wherein $\lambda$ is the wavelength of a laser beam used and n is the refractive index of a dielectric material used.

The optical recording media of the present invention may further include any well-known additional layers such as protective layers, heat-accumulating layers, and reflective layers.

In the practice of the present invention, the optical recording medium may be either of one side recording type or of double side recording type wherein two substrates each having a recording layer thin film formed thereon are bonded with an adhesive into an assembly such that the recording layer thin films face each other wherein writing is carried out from the rear side of the substrates.

The optical recording media of the present invention are designed such that recording and reproducing operations are carried out in a recording layer thin film on a substrate using a laser beam, for example.

The optical recording media according to the first aspect of the present invention have a metal thin film layer of high magnetic permeability on the recording layer thin film. There are obtained a number of advantages including a long lasting film formation process, a significant increase in initial C/N ratio, and humidity proofness, that is, retarded deterioration of the recording layer even in a high-humidity atmosphere.

The optical recording media according to the second aspect of the present invention have a transparent dielectric film layer between the substrate and the recording layer thin film of the optical recording media according to the first aspect. This further enhances the above-mentioned advantages.

EXAMPLES

In order that those skilled in the art will better understand the practice of the present invention, examples of the present invention are presented below by way of illustration and not by way of limitation.

Example 1

Recording layer thin films were formed on pregrooved disc substrates of polymethyl methacrylate (PMMA) having a diameter of 20 cm by sputtering thin films of TbFeCo alloy to thicknesses of 100 nm, 50 nm, 30 nm, and 10 nm. The target used was an iron target having Tb and Co chips placed thereon.

Metal thin film layers were formed on these recording layer thin films by sputtering Permalloy (Ni78Fe18Mo4) to varying thicknesses as shown in Table 1. The resulting samples which illustrate the present invention are designated sample Nos. 1, 2, 3, and 4.

Another sample was prepared by additionally forming a transparent dielectric film layer on a substrate before the recording layer thin film was formed on the substrate in sample No. 2. It is designated sample No. 5. The transparent dielectric film layer was formed by sputtering $Si_3N_4$ to a thickness of 75 nm.

For comparative purpose, comparative sample Nos. 6 and 7 were prepared by repeating the procedure of sample Nos. 1 and 3 except that no metal thin film layer was formed on the recording layer. Comparative sample Nos. 8 and 9 were prepared by repeating the procedure of sample Nos. 4 and 1 except that the metal thin film layer of Permalloy (Ni78Fe18Mo4) were formed to thicknesses of 20 nm and 300 nm.

These samples were tested as follows.
Initial C/N ratio (dB)

The initial carrier-to-noise (C/N) ratio expressed in dB of the samples was measured by carrying out recording under conditions: magnetic field 500 Oe, carrier 500 kHz, and bandwidth 30 kHz, using a semiconductor laser beam having a power of 20 mW and a wavelength of about 830 nm.

Aged C/N ratio (dB)

The samples were shelf aged for 30 days in an atmosphere at a temperature of 50° C. and a relative humidity (RH) of 95%. The C/N ratio of the aged samples was measured under the same conditions as above to determine the deterioration of C/N ratio.

The results are shown in Table 1.

TABLE 1

| Sample No. | Thickness | | | C/N ratio | |
| --- | --- | --- | --- | --- | --- |
| | Recording layer (nm) | Metal thin film (nm) | Dielectric film (nm) | Initial (dB) | Aged (dB) |
| 1 | 100 | 80 | — | 50 | 49 |
| 2 | 50 | 50 | — | 52 | 50 |
| 3 | 30 | 70 | — | 54 | 53 |
| 4 | 10 | 70 | — | 48 | 47 |
| 5 | 50 | 50 | 80 | 55 | 53 |
| 6* | 100 | — | — | 40 | unmeasurable |
| 7* | 30 | — | — | 30 | unmeasurable |
| 8* | 10 | 20 | — | 30 | unmeasurable |
| 9* | 100 | 300 | — | 40 | 40 |

*samples outside the scope of the invention.

Example 2

The stability of the film formation process was examined using a TbFeCo target of the same structure as used in Example 1. The time during which the target could be used was measured.

The sputtered films of TbFeCo varies their composition with the lapse of time. When a Permalloy layer was formed on a recording layer thin film, all the TbFeCo films formed were perpendicular magnetizable films even after 500 hours of continuous sputtering which were satisfactory for use as optical magnetic recording media. In contrast, when the structure was free of a Permalloy layer, TbFeCo films formed during continuous sputtering became longitudinally magnetizable films after 300 hour operation and thus were not applicable as optical magnetic recording media.

Example 3

A target was prepared by changing ±5% the Tb content of the TbFeCo target composition of Example 1. Using this target, samples corresponding to sample Nos. 3 and 7 were prepared by sputtering. The resulting samples were measured for initial C/N ratio.

The sample corresponding to sample No. 3, that is, having a Permalloy layer exhibited a deviation of C/N ratio of only 2 dB, but the sample corresponding to sample No. 7, that is, free of a Permalloy layer exhibited a deviation of C/N ratio of 10 dB.

The data of Example 1 (shown in Table 1) and Examples 2 and 3 demonstrate the effect of the present invention.

We claim:

1. An optical magnetic recording medium comprising a substrate,
a recording layer thin film comprised of a rare earth element and a transition metal on the substrate, and
a metal thin film layer having a high magnetic permeability on the recording layer, wherein the recording layer thin film is at least 5 nm thick, the metal thin film layer is at least 20 nm thick, and wherein the total thickness of the recording layer thin film and the metal thin film layer ranges from 50 to 200 nm wherein said metal thin film layer is permalloy.

2. The optical recording medium of claim 1 which further comprises a transparent dielectric film layer between the substrate and the recording layer thin film.

* * * * *